(12) United States Patent
Lahon et al.

(10) Patent No.: US 8,812,898 B1
(45) Date of Patent: Aug. 19, 2014

(54) SYSTEM AND METHOD FOR TRANSFER OF DATA BETWEEN MEMORY WITH DYNAMIC ERROR RECOVERY

(71) Applicant: Cadence Design Systems, Inc., San Jose, CA (US)

(72) Inventors: Manas Lahon, Bangalore (IN); Sandeep Brahmadathan, Bangalore (IN)

(73) Assignee: Cadence Design Systems, Inc., San Jose, CA (US)

( * ) Notice: Subject to any disclaimer, the term of this patent is extended or adjusted under 35 U.S.C. 154(b) by 203 days.

(21) Appl. No.: 13/628,982

(22) Filed: Sep. 27, 2012

(51) Int. Cl.
*G06F 11/00* (2006.01)

(52) U.S. Cl.
USPC .............................. 714/4.2; 714/748; 714/800

(58) Field of Classification Search
CPC ............ G06F 11/1004; G06F 11/1402; G06F 11/1423; G06F 11/142; G06F 11/1443; G06F 11/20; H04L 1/08
USPC .......................................... 714/4.2, 748, 800
See application file for complete search history.

(56) References Cited

U.S. PATENT DOCUMENTS

| | | | |
|---|---|---|---|
| 5,774,482 A * | 6/1998 | Grewal | 714/764 |
| 6,161,208 A * | 12/2000 | Dutton et al. | 714/764 |
| 8,453,009 B2 * | 5/2013 | Shinozaki | 714/6.1 |
| 8,615,679 B2 * | 12/2013 | Smith et al. | 714/5.1 |
| 2005/0129045 A1 * | 6/2005 | Machulsky et al. | 370/428 |
| 2009/0024899 A1 * | 1/2009 | Reid | 714/758 |
| 2009/0193308 A1 * | 7/2009 | Habermann et al. | 714/746 |
| 2010/0005366 A1 * | 1/2010 | Dell et al. | 714/758 |
| 2012/0266041 A1 * | 10/2012 | Wang et al. | 714/752 |
| 2013/0019053 A1 * | 1/2013 | Somanache et al. | 711/103 |
| 2014/0026013 A1 * | 1/2014 | Koseki | 714/764 |

* cited by examiner

*Primary Examiner* — Marc Duncan
(74) *Attorney, Agent, or Firm* — Rosenberg, Klein & Lee (57) ABSTRACT

A system and method are provided for ensuring reliable data transfers by automatically recovering from un-correctable errors detected in data traversing throughout a system and being retrieved from an unreliable intermediate data buffer between a first memory and a secondary slower memory. Additionally, measures to compensate for the use of unreliable or error-prone components and interconnects, such as, for example, SRAM memory as a temporary buffer are provided. Further, measures to detect and correct errors—whatever the type—injected or occurring at any stage throughout traversal of the system are provided.

25 Claims, 8 Drawing Sheets

SYSTEM AND METHOD FOR TRANSFER OF DATA BETWEEN MEMORY WITH DYNAMIC ERROR RECOVERY

The subject system and method are generally directed to ensuring reliable and accurate transfer of data throughout a system, and particularly, from a first memory to a second memory by way of at least one intermediate location with mid-stream error detection and remediation. Additionally, self-recovery from uncorrectable system errors and failures during a data transfer throughout a system is provided. These errors are particularly likely where the second memory is generally slower and requires a rate-matching buffer or temporary storage interface between the first and second memories. The system and method provide automated measures for preventing system failure and responding seamlessly to uncorrectable errors detected mid-stream in a data segment retrieved from an intermediate location such as, for example, a static ram (SRAM) buffer during a transfer of a requested frame of data. During the course of data transfer between memory devices, the transferred data may be corrupted by errors deriving from various sources. Such errors may be injected at any of numerous points along the path of data transfer, including an intermediate buffer, such as SRAM. Therefore, the system and method provided herein ensure accurate transfers of data and instructions throughout a system or systems by way of parity, error correction, and/or selectively routed retransmission, amongst other measures, to thereby obviate all manner of errors experienced throughout the system.

In other instances involving more robust systems where measures have been established to determine whether a transfer has failed and take subsequent remedial action to execute the transfer again in toto, the instant system and method significantly reduce delay and increase efficient operation thereof. Such delay in waiting for completion of the entire requested transaction, determining whether a fault has occurred through evaluation of the entirety of the transferred data frame, and re-transferring the entirety of the data upon determination of the fault is obviated herein. Rather, a segmented approach that detects errors within each segment and selectively acts to remedy the error during transmission of a requested frame of data segments in a system, such as, for example, between a first memory and a second memory is provided for herein.

As circuit design progresses, dies shrink, the size of component features (most notably transistors) therein dramatically decrease in size, the designed circuits (and particularly memory modules incorporating such transistors) become less reliable. As the dies and fabrication processes create smaller and smaller features, such as the progression from, for example 90 nanometer feature size to 65 nm, 45 nm, 32 nm, 22 nm and beyond, the individual transistors and other features of the circuit become more susceptible to quantum phenomena such as cell leakage or charge migration, amongst other problems. In such an event, the charge may undesirably migrate through insulative dielectric layers resulting in unknown unintended system states, leading perhaps to catastrophic system failure.

Increasing clock rates, low power constraints, and unfavorable environments, only exacerbate such issues. These phenomena have a measurable and significant negative impact on system memory, busses, processors, and other components. Aside from quantum phenomena, all manner of issues may act to degrade system performance and result in errors at virtually any stage of a system such as, for example, transmission line errors, interference, crosstalk, parasitic capacitance, power surges, spikes, and the like. As distances between traces in a routed circuit become smaller and densities increase, such parasitics and resultant errors in transmission, storage, and reception become increasingly more likely. Indeed, errors may occur in countless manners throughout virtually any components and/or interconnects throughout a system.

One such example of error-prone components are transistors within a densely packed circuit design. Such transistors are an elemental component used in the design of circuits, systems, and, particularly, memory modules; often times hundreds of millions of transistors may be present in a single processor or memory module. Transistors are very commonly used in memory packages such as Static Ram (SRAM)—with numerous transistors working cooperatively to store just one bit of data. As SRAM packages designed to store upwards of 128 million bits of data and other memories with capacities counted in the billions of bits are becoming commonplace, the above described quantum phenomena in aggregate may have serious effects on memory and system stability—especially in critical infrastructure such as satellites, nuclear control facilities, extra-terrestrial rovers, and the like. Charge stored in transistors or devices such as flip flops may represent mission-critical data, and if the charge is lost through cell migration or other such quantum phenomena, the mission-critical data may be lost, possibly resulting in catastrophic system failure.

Additionally, as further examples, such circuits are susceptible to stray radiation, electrostatic discharge, and other issues that may not affect more conventional larger-feature-size circuits. As systems continue to decrease in size and reliance on such systems increases, the susceptibility to these issues and the likelihood of catastrophic failure is only more likely to increase.

In such systems, it is frequently necessary to move data (for example, representing a planetary mapping program, health sensor readings, magnetic resonance imaging (MRI) data, nuclear plant control data, an image to be printed, or the like) across a system or systems from one memory to another memory to accomplish an intended system goal towards a real-world result. When transferring such data from a fast memory, such as DRAM (Dynamic Random Access Memory) to a slower memory, such as FLASH memory, it is often desirable and necessary to use a rate matching buffer, such as SRAM (disposed intermediately between the first and second memory) to allow for a harmonious exchange of data from the first memory to the second memory (as the two memories may have different reading and writing speeds, a plurality of concurrent transfer requests, divergent duty cycles, clock frequencies, and the like).

Increasingly, Static RAM (or SRAM) is used as the rate matching buffer between the first memory and the second memory. Indeed SRAM is ubiquitous throughout many different systems ranging from laser printers to healthcare devices to nuclear power control and distribution systems to pacemakers to common smart phones and the like. As circuit size and features continue to decrease, such SRAM buffers, amongst other components, become increasingly more susceptible to errors. Consequently, systems which rely on SRAM buffers become increasingly more likely to have catastrophic failures. Ultimately, as reliance on these systems only continues to exponentially increase—the gravity of these failures becomes much more serious.

Aside from catastrophic failure, system efficiency and speed become increasingly important as multi-tasking and processor-intensive applications become more commonplace. The Central Processing Units (CPUs) are increasingly offloading some of their functions to dedicated co-processors or application processors. One example of this is a transfer-offloading controller such as a Direct Memory Access controller (DMA) which allows a central processor to avoid unduly inefficient and slow input/output (I/O) operations, such as transferring large amounts of data from a first memory to a second memory. With such a DMA offloading paradigm, a CPU rather than initiating and actively supervising a transfer will instead delegate transfer supervision to the DMA controller. In this manner, rather than being tied up itself with each individual transaction, error correction, and verification, the CPU merely instructs the DMA controller, for example, to copy a first location from a first memory, the amount of data to be copied, and a second location on the secondary memory to be copied to. Additionally, the CPU may advise the DMA controller of other information like bus width or the capacity for the system to transfer data from the first memory to the second memory. The CPU is freed thereby to address other processing matters while the DMA controller semi-autonomously performs data transfers. Upon DMA completion, the DMA controller advises the CPU that the transfer has completed. In such an instance, the problem of ensuring reliable data transmission is particularly acute and there is a higher likelihood of further delay as the DMA controller may not be instilled with advanced recovery and error correction procedures, amongst other issues.

Such DMA processes generally initiate transfer from the first memory to the second memory by way of an intermediate buffer (such as the exemplary SRAM buffer) inasmuch as the two memories rarely have identical reading/writing characteristics. As die sizes shrink, this SRAM buffer becomes more error prone. The DMA controller does not have the logic or capability to be able to intelligently handle un-correctable errors and other such unexpected conditions. Therefore, in the event of an un-correctable error in the data in the buffer (such as from cell leakage, stray radiation, electrostatic discharge, transmission line errors, or other such errors or quantum phenomena or causes of errors), the DMA controller, on experiencing an error, typically halts all transfers and interrupts the CPU, advising that there was an error and that the transfer has failed. At this point, the CPU being faced with an unrecoverable error may simply halt the system inasmuch as data is in an indeterminate state and may report such to the user. Such failure may be of only minor significance in a desktop computer or home entertainment system; however, in more critical systems, the consequences may well be grave. Moreover, even where the CPU has the ability to handle such an un-correctable error and continue with alternate tasks or reinitiate the transfer in toto, significant undue delay is induced.

There is therefore a need for a system and method for ensuring reliable data transfers, avoiding and/or remedying all manner of errors, improving the efficiency of such transfers, and automatically recovering from uncorrectable errors occasioned, for example, during a transfer from a first memory to a second memory utilizing even a simple, relatively unreliable intermediate buffer.

SUMMARY OF THE INVENTION

It is an object of the present invention to provide a system and method for transmitting data via intermediate storage having dynamic error recovery from all manner of errors—whatever the source.

It is an object of the present invention to provide a system and method for automatically recovering from uncorrectable errors in an offloaded transfer such as a direct memory access (DMA) transfer.

It is another object of the present invention to provide a system and method for compensating for or addressing the increasingly unreliable memory and/or transmission lines in a system.

These and other objects are attained in the system and method for automatically recovering from an uncorrectable error in a transfer.

A method realized in accordance with the present invention includes transmission of data from a first memory to a second memory via intermediate storage having dynamic error recovery by establishing a transfer controller coupled to the first and second memories and a storage intermediary. Data to be transferred is stored in the first memory. The transfer controller is executed to actuate transfer of the data from the first memory in a plurality of segments of selectively set length to the storage intermediary. The storage intermediary is monitored for uncorrectable error in each data segment transferred thereto. The data segment is written to the second memory in the absence of an uncorrectable error therein. Upon detection of an uncorrectable error in a transferred data segment the transfer controller is executed to re-transfer the data segment from the first memory and write the data segment to the second memory with bypass of the storage intermediary.

A system realized in accordance with the present invention includes ensuring reliable data transfer by automatically recovering from un-correctable errors during transfers from a first memory to a second memory via a storage intermediary. A transfer controller is coupled to and transfers data packets between a first memory and a second memory. A storage intermediary is disposed intermediate the first and second memories. The storage intermediary temporarily stores data packets destined for the second memory. An error detection module signals the transfer controller to retrieve a replacement data portion of a corrupt data packet from the first memory responsive to an affirmative determination of corruption in a data packet retrieved from the storage intermediary. A bypass controller is coupled intermediate to the first memory and the second memory, the bypass controller selectively transmits the replacement data portion to the second memory. The transmitting bypasses the storage intermediary responsive to the determination of corruption upon retrieval of the data packet from the buffer.

Another method realized in accordance with the present invention includes ensuring reliable transmission of data from a first memory to a second memory via an Error Correcting Codec (ECC)-controller-protected buffer. A transfer controller is executed to transfer segments of a requested frame of data from a first memory to a second memory via an ECC-protected buffer. An ECC controller is executed to detect an uncorrectable erroneous segment upon retrieval of the uncorrectable erroneous segment from the ECC-protected buffer before completion of transfer of the requested frame of data into the second memory. A location in the first memory corresponding to the uncorrectable erroneous segment is identified. A replacement segment is selectively retrieved from the identified location in the first memory. The replacement segment is then transferred to the second memory exclusive of the ECC-protected buffer.

Another system realized in accordance with the present invention for transmission of data from a first memory to a second memory via intermediate storage having dynamic error recovery includes: a first memory and a second memory, data to be transferred is stored in the first memory. A storage intermediary is coupled to the second memory. A transfer controller is coupled to the first memory, the second memory, and the storage intermediary. The transfer controller actuates transfer of the data from the first memory in a plurality of segments of selectively set length to the storage intermediary. An error detecting module monitors the storage intermediary for uncorrectable error in each transferred data segment. The transfer controller writes the data segment to the second memory in the absence of an uncorrectable error therein; and, upon detection of an uncorrectable error in a transferred data segment, alternatively executes the transfer controller to re-transfer the data segment from the first memory and writes to the second memory with bypass of the storage intermediary.

Additional aspects and details will be set forth in part in the description which follows, and, in part, will be apparent from the description.

DETAILED DESCRIPTION OF THE PREFERRED EMBODIMENTS

One example of the system and method realized in accordance with the disclosed embodiment seeks to provide and ensure reliable transfer of data from one memory to another memory and provide for automated recovery from an uncorrectable error encountered in a transfer from the first memory to the second memory by way of an unreliable intermediate buffer. Another example of the system and method realized in accordance with the present invention seeks to mitigate the dangers of an unreliable buffer memory such as SRAM.

Figure 1:
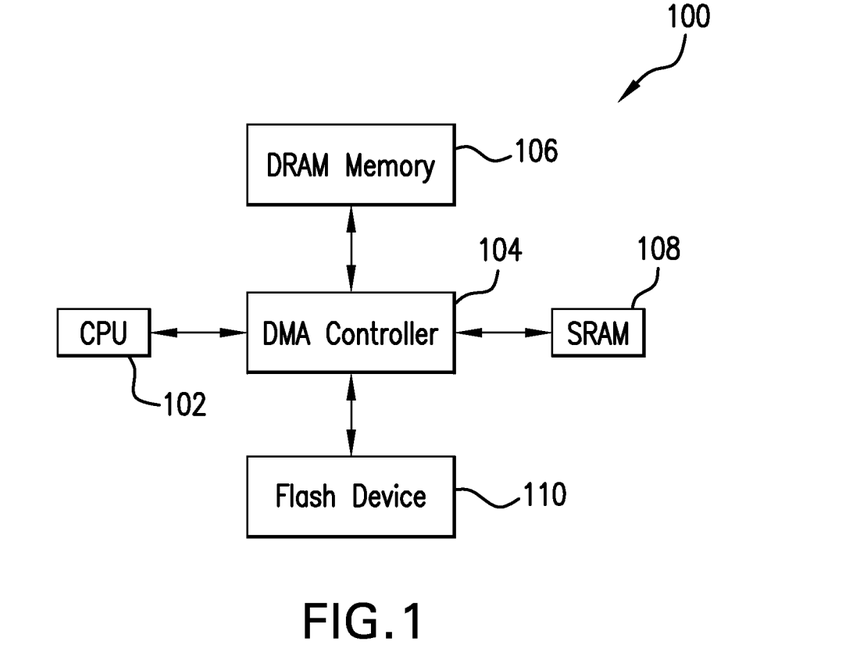
FIG. 1 is a highly simplified block diagram illustrating a system formed in accordance with one exemplary embodiment of the present invention.

As seen in the illustrative diagram of FIG. 1, a system 100 includes a central processing unit (CPU) 102 intercoupled with a direct memory access (DMA) controller 104 itself coupled to a first memory 106 (referred to herein illustratively as a DRAM memory), a secondary memory 110 (referred to illustratively throughout as a flash device), and a buffer 108 (illustratively referred to herein as an SRAM FIFO). First memory 106 is preferably a DRAM or dynamic random access memory having a high transfer rate which must be periodically refreshed with a charging current. First memory 106 may alternatively include RAMBUS (TM) RDRAM, SDRAM, a solid state drive (SSD), a Redundant Array of Inexpensive Disks (RAID), a network attached storage (NAS), another flash memory device, or indeed any memory.

The secondary memory 110 may also be any type of memory including, for example, an SSD, an array of flash devices, a single flash device such as a memory chip, a tape drive, a slow hard drive, a virtual disk, a NAS, or indeed, any memory. The buffer 108 is generally a Static Random Access Memory (SRAM) First-In First-Out (FIFO) buffer. However, this may be replaced with any type of memory as well. Indeed, any buffering scheme may be used as well, such as FIFO, Last-In First-Out (LIFO), and the like.

Additionally, the CPU 102 may be any type of central processing unit capable of processing instructions and addressing memory. The DMA controller 104 may be any type of secondary processor that may be controlled by a central processing unit 102. Indeed, the DMA controller 104 may be merely a delegable co-processor. In this sense, the processor 102 rather than executing a task with low processing requirements and high input/output requirements—which may result in a long periods of wait, merely delegates such a task to a secondary or separate processor such as the DMA controller 104. However, such use of DMA controller 104 throughout is not meant to be limiting—indeed, in some embodiments, though inefficient, the CPU 102 itself may act as the transfer supervising processor rather than a DMA controller. In some embodiments, the DMA controller 104 may be integrated wholly within the CPU 102 or disposed within a System On Chip (SOC) such that differentiation therebetween may be meaningless for some purposes. The CPU 102 and DMA controller 104 may operate in much the same manner through their common coupling to the bus and may both have direct access to each of the first and second memories and an intermediate location, such as a buffer.

Figure 2:
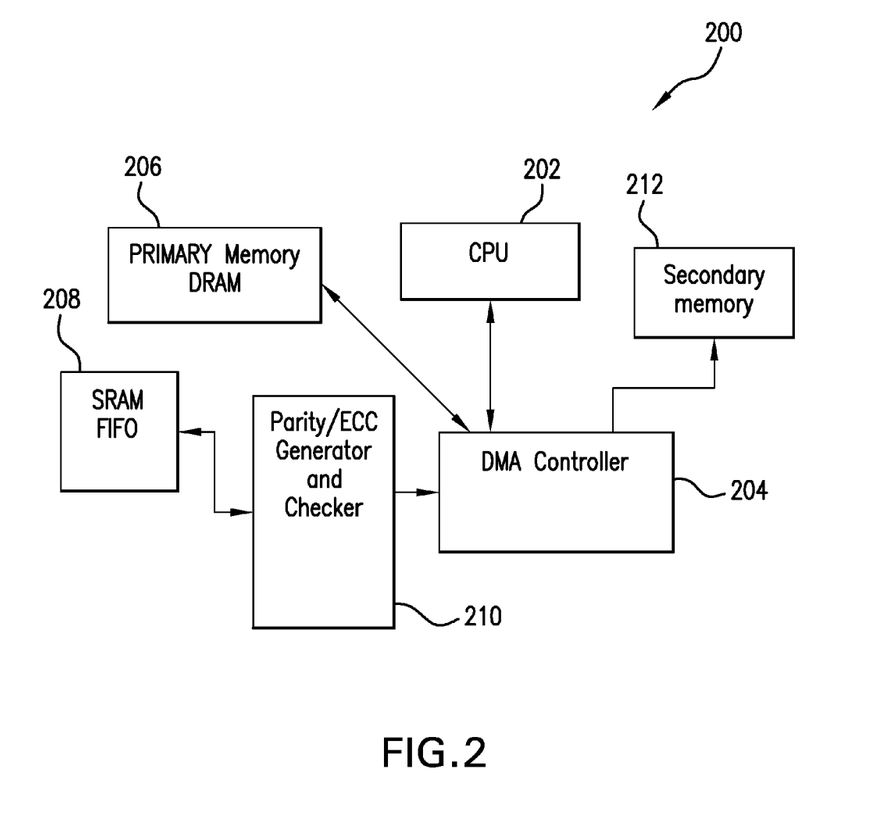
FIG. 2 is another simplified block diagram of a system illustrating a more detailed system formed in accordance with one exemplary embodiment of the present invention.

As seen in the illustrative diagram of FIG. 2, a system 200 includes a central processor 202 intercoupled with a DMA controller 204 which is itself coupled to a primary memory 206, secondary memory 212, and a buffer 208. A Parity/ECC generator and checker 210 is interposed between the buffer 208 and DMA controller 204. While Parity/ECC generator and checker 210 is shown external to DMA controller 204, such Parity/ECC generator and checker 210 may indeed be incorporated within the DMA controller 204 in certain embodiments of the present invention. Such Parity/ECC generator and checker 210 may utilize parity, ECC, or other such measures to reliably determine and/or correct errors which have occurred at any stage of the transfer throughout the system. Additionally, while the primary memory 206 and secondary memory 212 are shown merely as a memory medium, it may be that each of the first and second memories, respectively, contain a controller for receiving requests and directly accessing the respective memory.

In an exemplary embodiment of the present invention, a CPU 202 instructs a DMA controller 204 to initiate a transfer of a certain data frame from primary memory 206 to a secondary memory 212 (which may be, for example, a flash device). In transferring data from the primary memory DRAM 206, the DMA controller 204 retrieves the data from the primary memory DRAM 206 and temporarily or intermediately stores the data into a buffer 208 which may be formed of SRAM memory disposed external to or integral to the DMA controller 204. In a preferred embodiment, the buffer 208 is a first in/first out (FIFO) buffer though other arrangements may be used as well.

The SRAM buffer is but one example of a notoriously unreliable memory due in part to the fact that it is not periodically refreshed with charge as is the case with DRAM and therefore, as cell size decreases, the error rate increases. Further, as the quantity of SRAM increases, errors become increasingly likely. Thus, the SRAM buffer is notoriously unreliable and as a result, parity data or a checksum must generally be generated on data to be buffered to thereby enable a determination whether data coming from the SRAM buffer has been corrupted or compromised during transmission throughout the system, buffering, or retrieval thereof. Additionally, an Error Correcting Codec (ECC) may be generally applied to correct minor errors that have occurred in data that was temporarily stored in the SRAM buffer. However, the amount of overhead required in terms of storage and processing becomes too large to account for more than minor errors. If, for example, two bits are reserved for Error Correcting Codecs (ECC) for each 8 bits of data, it is seen that potentially one or two errors may be accounted for and corrected. However, when two errors must be corrected, it is seen that a multiple variable problem may ensue and the ability to correct errant data decreases sharply.

Thus, while the Parity/ECC generator and checker 210 may be able to determine errors in most instances and correct errors in some instances, a need for improved measures for dealing with faulty buffers and ensuring overall system stability in the face of un-correctable errors is needed. It bears noting that while errors originating in SRAM buffers have been illustrated throughout, such illustrations are merely exemplary, and all manner of errors are addressed herein.

Figure 5A:
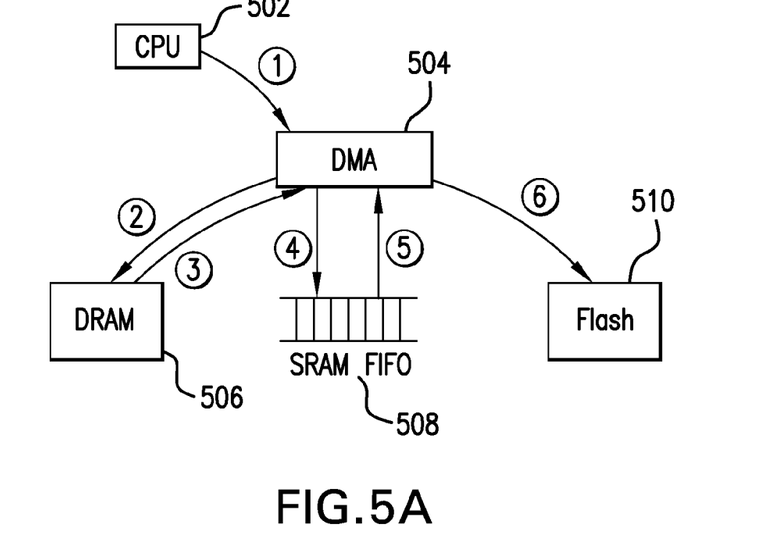
FIG. 5A is an exemplary flow diagram illustrating the flow of commands and data in an exemplary embodiment of the present invention.

FIG. 5A shows a highly simplified offloaded data transfer flow from a first memory to a second memory by way of an intermediate unreliable buffer. It is noted that this is an ideal situation where no errors have been detected or if the errors have been detected, they were able to be corrected in the flow. Initially, the CPU 502 offloads the memory transfer by sending a request 1 to DMA controller 504. DMA controller 504 sends a responsive request 2 to the DRAM or primary memory 506. The DRAM controller 506 (shown here merely as DRAM media for simplicity) sends a responsive signal/s 3 to the DMA controller 504 containing the requested data. DMA controller 504 then transmits the requested data via signal 4 to the buffer 508. Buffer 508 operates in a first-in/first-out (FIFO) manner and assuming no other packets are ahead of the instant packet from signal 4, the SRAM buffer 508 re-transmits the data packet through signal 5 back to the DMA controller 504. DMA controller 504 then sends the data packet via signal 6 to the flash or secondary memory 510.

Figure 5B:
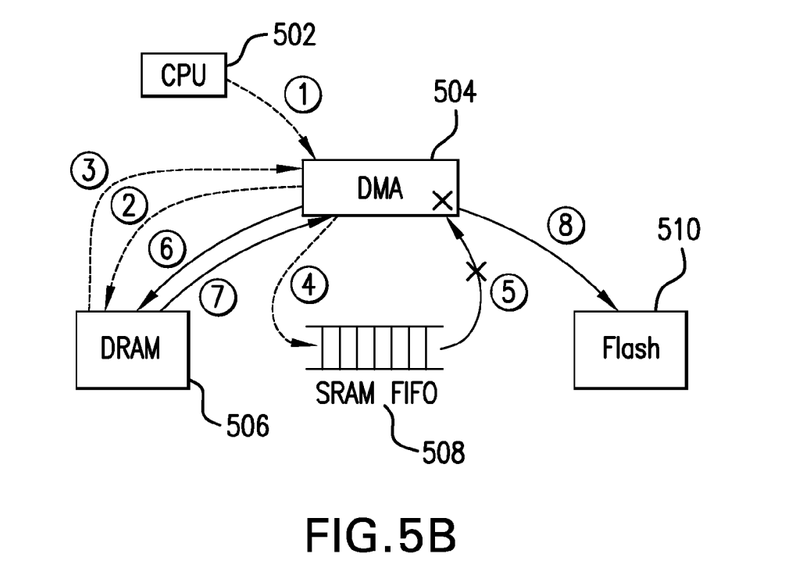
FIG. 5B is another simplified flow diagram illustrating an exemplary recovery from an uncorrectable error in accordance with an illustrative embodiment of the present invention.

FIG. 5B illustrates an exemplary offloaded data transfer flow experiencing an uncorrectable error and an automatic recovery. Initially, a CPU 502 requests a specific transfer via signal 1 to DMA controller 504. DMA controller 504 initiates the request through a signal 2 to the primary memory 506. The controller built into the primary memory 506 responds with the requested data via signal 3 back to the DMA controller 504. The DMA controller 504 then sends the received data packet via signal 4 to the buffer 508. It bears noting that the buffer 508 may indeed be integral to the DMA controller 504 or in certain embodiments where the CPU 502 itself acts as transfer supervisor, the buffer 508 may reside in the CPU.

The data packet is retrieved from the buffer 508 at signal 5 where it is detected that an uncorrectable error condition exists, such as, for example, two separate bits being corrupted in the data which may be beyond a threshold of correctability by the ECC. At this point the DMA controller 504 may then pause all outstanding transactions related to the buffer 508 and/or the primary memory 506, determine the location in primary memory 506 containing the uncorrectably errant data, and then create a high priority request signal 6 that requests the primary memory 506 to perform a high priority retrieval and fetch of the uncorrectable data. The primary memory controller 506 then forwards the re-retrieved data through signal 7 back to the DMA controller 504 exclusive of the buffer 508 and is forwarded directly to flash or secondary memory 510. Paused transactions are restored and, upon completion of the transfer, DMA controller 504 reports success to the CPU 502.

Figure 3:
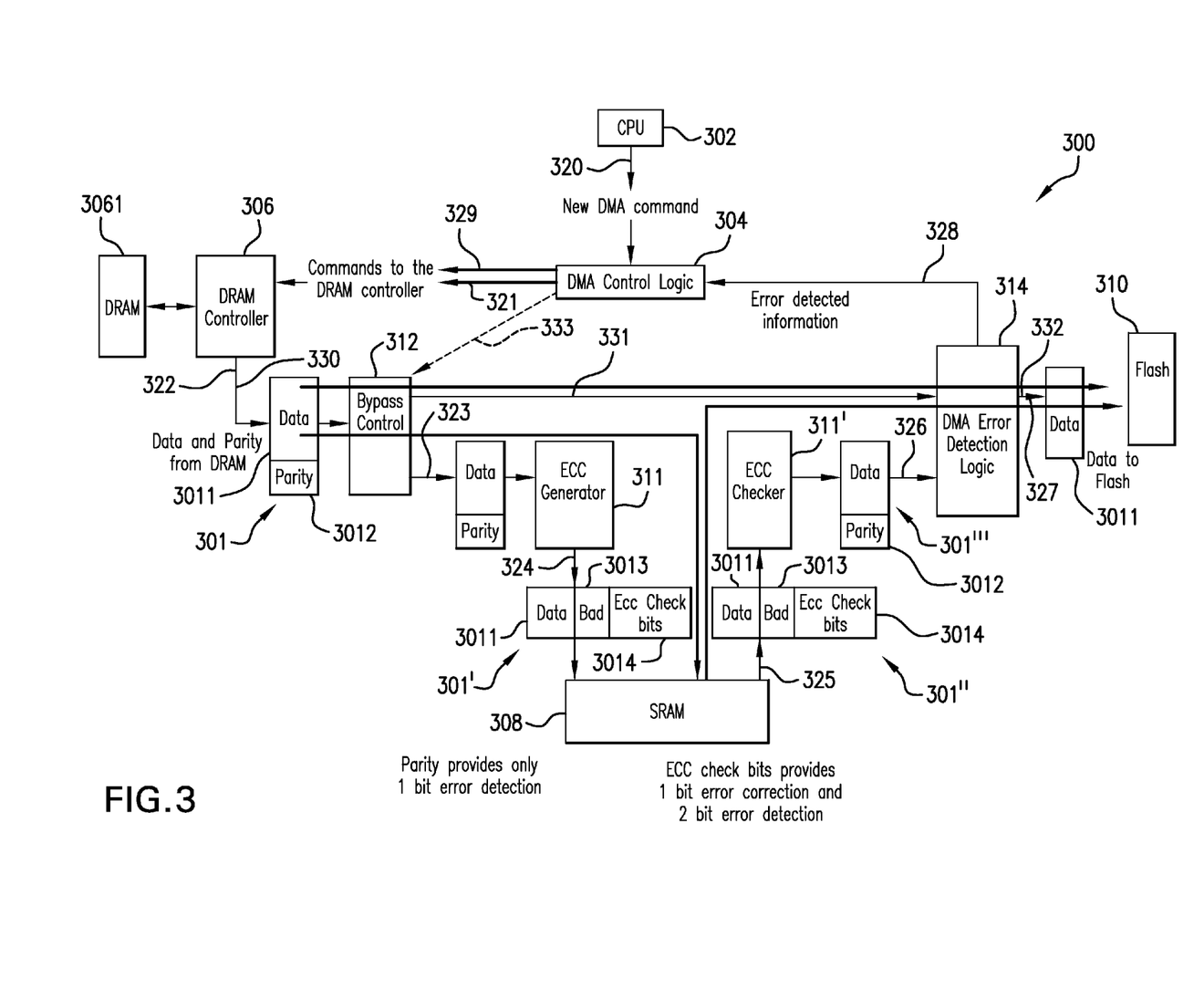
FIG. 3 is a block diagram illustrating an exemplary intercoupling of operational components and the flow of data and instructions therebetween in accordance with an exemplary embodiment of the present invention.

As seen in more detail in the illustrative flow chart of FIG. 3, a CPU 302 initiates a transfer by sending a signal 320 which may be a command to instruct the direct memory access (DMA) controller 304 to initiate a transfer. The DMA control logic 304 receives the instruction 320 from the CPU 302 and instructs a first memory 306 by sending a command 321 to the first memory 306 which may include a DRAM controller. The DRAM controller 306 may receive the instruction 321 and responsively fetch or retrieve a memory location specified by the command 321 to be retrieved from the first memory or DRAM 3061. Once the data is retrieved, the DRAM controller 306 generates and sends a signal 322 which includes the requested data and a parity bit or checksum which may be used to determine the successful arrival of the entirety of the requested data. The parity bit may be generated according to any means known to one of skill in the art, such as by hashing, digesting, or performing a check sum on the payload of the data.

DRAM controller 306 transmits a packet 301 which may include a payload portion 3011 and a parity portion 3012 generated responsive to an evaluation of the payload portion 3011. The parity portion size may be set responsive to the likelihood of error in the payload portion 3011 due to transmission, storage, and/or reception in each component throughout the intended transfer path. In a system where there is little likelihood of error, the parity bit may be a single bit, whereas in an error prone system, a greater amount of parity may be used to further detect or quantify the type of error.

The data packet 301 is passed to a bypass control 312 which may include a filter, a multiplexer, a router, or the like. Bypass control 312 will ordinarily pass on the data packet 301 by signal 323 to an ECC generator 311. In this normal mode of operation, the bypass control 312 will pass on the data packet 301 received from the first memory 306 to be routed ultimately throughout the system to the specified destination, such as secondary memory 307. However, the bypass controller 312 is preferably provided with an alternate operating mode whereby the bypass controller 312 bypasses the entirety of the Error Correcting Codec (ECC) generator 311 and checker 311' and the rate matching buffer 308 and instead directly passes on the data packet to the secondary memory 307 (in some embodiments stopping briefly only at the DMA Error Detection Logic 314).

However, in the course of transfer, bypass controller 312 merely receives the data packet 301 and passes this along in signal 323 to an Error Correcting Codec (ECC) generator 311. The Error Correcting Codec generator 311, in a preferred embodiment, performs a preliminary determination of parity to evaluate whether the payload data 3011 in the data packet 301 has been compromised. To do so, the ECC generator 311 performs a function on the payload portion 3011 of data packet 301 symmetric to the parity generation function in the DRAM controller 306 and ECC generator 311 then compares the result of the symmetric function with the parity portion 3012 of the data packet 301. If there is identity between the generated parity and the previously stored parity 312, then the ECC generator 311 may assume that the data portion or payload portion 3011 of the data packet 301 has successfully passed from the first memory (DRAM controller) 306 to the ECC generator 311 without error.

If, however, the parity generated with the symmetric function in the ECC generator 311 is divergent from the parity portion 312 in the data packet 301, then ECC generator 311 may assume that an error has occurred. As the parity data 312 is merely able to detect an error and not correct an error, the ECC generator is unable to correct errors that have occurred and merely flags the received data as bad. ECC generator creates a new field in the data packet 301, creating a new or modified data packet 301' having a new field "bad" 3013, however, in certain embodiments, the ECC and/or parity data is maintained separate from the data payload. This bad bit flag 3013 may thereby denote whether the data packet 301 was compromised in flight.

Further, the ECC generator 311 generates an additional field or portion of the data packet 301': the ECC portion 3014. The ECC portion 3014 may occupy two bits and may be used to regenerate a portion of the data payload 3011 which may have been compromised in flight. Once the ECC has been generated and appended to the data packet 301, the ECC generator 311 sends a signal 324 including the more resilient data packet 301' to the buffer memory 308 which may include SRAM or any other type of memory.

In a preferred embodiment, the buffer 308 operates as a first-in, first-out (FIFO) buffer. The FIFO buffer 308 in this manner generally receives a first packet and outputs the first packet before a second or subsequent packet is output. Thus, a FIFO buffer outputs sequentially responsive to the reception of packets. The buffer 308 may thereby be utilized as a rate-matching buffer. In an exemplary embodiment, the first memory 306 is faster than the second memory 310 and thus data items are retrieved relatively quickly from the first memory 306. However, transmission of the retrieved data items may be limited by the writing speed of the secondary memory 310. Thus, to compensate for this delay in writing, data packets are temporarily stored in the buffer 308 to allow time for the secondary memory 310 to complete a writing operation of a previous packet. In an exemplary embodiment, the buffer 308 may provide for up to eight buffer words at 17 bits per piece, however, the size may change.

DMA controller 304 takes data packets from buffer 308 and sends packets through signal 325 to the secondary memory 310 responsive to indicia of completion of the writing of a previous packet into the secondary memory 310. As the buffer 308 is highly error prone, it is possible that data payload portion 3011 of the data packet 301" may have been compromised. The data packet 301" is passed to the ECC checker 311'. ECC checker 311' may take the data 3011 portion of the data packet 301" and use a function symmetric to the function used in ECC generator 311 to arrive at its own version of ECC portion 3014. If there is identity between the ECC portions 3014, then it may be determined that the data portion 3011 has not been corrupted in-transit and the packet 301" may be passed on through a signal 326 to a DMA error detection logic 314.

Otherwise, the ECC checker 311' may be able to use the ECC portion 3014 to regeneratively restore portions of the data 3011 which may have been lost in flight or during buffering at the buffer 308. While the ECC checker 311' may be able to regeneratively restore in instances of one bit corruption, it is unlikely that the ECC checker 311' would be able to correct multiple different concurrent errors or corruptions of the data. In such an instance, the data may be flagged as uncorrectable. The uncorrectable data packet 301'" may be sent through signal 326 with a parity portion 3012. If either the data was never corrupted or if the data corruption was correctable, then the ECC checker 311' may merely pass on the data portion 3011 along with the regenerated parity 3012 to the DMA error detection logic 314 which may evaluate the data 3011 according to the parity 3012 and selectively pass on the data packet 301'" via signal 327 to the secondary memory 310. However, where the ECC checker 311' is unable to correct the corrupted data portion, the ECC checker 311' may intentionally set an erroneous parity bit 3012 so as to trigger the DMA error detection logic 314. In this instance, the ECC checker 311' may put in a known-erroneous code into parity 3012 such as by adding one or subtracting one from a legitimate parity value. Stated another way, the parity bit 3012 may be generated to be inconsistent with the data 3011. Such deliberate mis-setting of parity data 3012 triggers DMA error detection logic 314 to selectively send an error code 328 to the DMA control logic 304.

In a conventional approach, the DMA control logic 304, upon being informed of an unrecoverable or uncorrectable error, may simply halt all system functionality and send an interrupt message to the CPU 302. Such results are undesirable and may lead to grave consequences.

Where the error is un-correctable, the DMA control logic 304 responding to an uncorrectable error signal will then compute the location of the error and selectively re-fetch that uncorrectably corrupted data from the primary memory 3061. DMA control logic 304, in an exemplary embodiment, keeps track of locations of segments of data by receiving the start address (SA) from the CPU 302. The SA is then stored within the DMA control logic 304 and informs the DMA error detection logic 314 the length of the transfer. The DMA error detection logic 314 increments a counter as each segment of data is written into flash 310 successfully. The counter, for example, starts at 0 at the beginning of a transfer and is incremented either by 1 or the length of a segment on each segment being written to secondary memory 310. Once an error is encountered, DMA error detection logic 314 knows the address offset and presents such address to the DMA control logic 304. DMA control logic 304 adds the offset address to the stored SA to compute the address that needs to be re-fetched to serve as a replacement segment. As the DMA error detection logic 314 knows the amount of data to be transferred and after transferring that amount of data successfully to secondary memory 310, it notifies the DMA control logic 304 of the same and the DMA control logic 304 accordingly removes the stored address.

The primary memory controller 306, upon receiving the instruction to re-retrieve the replacement segment, then sends a signal 330 including a data packet 301 of the re-retrieved data 3011 with a regenerated parity 3012 to the bypass controller 312. Bypass controller 312 may operate responsive to a switching signal 333 from the DMA control logic 304 or the DRAM controller 306. The bypass controller 312 responds to the control signal 333 by then selectively switching transmission of an incoming data packet 301 from the buffer path to a secondary path 331, thereby bypassing ECC generator, buffer, and ECC checker, to arrive directly at the DMA error detection logic 314 which may then directly pass on the re-retrieved data packet 301 through a signal 332 to the secondary memory 310.

Upon receipt of the re-retrieved data, the DMA control logic 304 may then send another control signal 3033 to the bypass controller 312 to resume normal operation routing data packets 301 through the ECC generator 311, ECC checker 311', buffer 308, and the DMA error detection logic 314.

Upon completion of the DMA command 320 (the successful transfer of all requested data from primary memory 306 to secondary memory 310), the DMA control logic 304 sends a signal, preferably an interrupt, to the CPU 302. Such interrupt signal allows the DMA control logic 304 or DMA controller 304 to advise the CPU 302 that the instructed data transfer has completed successfully. In this manner, uncorrectable errors are gracefully recovered from and the transfer is completed without disturbing the central processor unit 302.

In certain embodiments where the uncorrectable corruption of data has occurred and the DMA control logic 304 has signaled 329 to the primary memory controller 306 that a re-retrieval needs to be performed, it may be seen that the primary memory 306 may be experiencing temporary delays or intermittent problems. In this case, the data may still be retrieved and sent through signal 330; however, the parity 3012 of the data packet 301 may be set incorrectly. Such incorrect parity 3012 may be detected at DMA error detection logic 314 which may, rather than pass on the corrupted data packet 301 to the secondary memory 310, instead re-advise the DMA control logic 304 through a signal 328 to re-fetch the data again directly from the primary memory 306. In a preferred embodiment where the primary memory has provided incorrect or corrupt data, this loop of requesting the data directly from the primary memory may be repeated up to eight times. However, one of skill in the art may realize that adjusting the number of iterations of this loop may be done for any number of reasons such as a statistical analysis of the duration of common error phases of primary memory.

Figure 4:
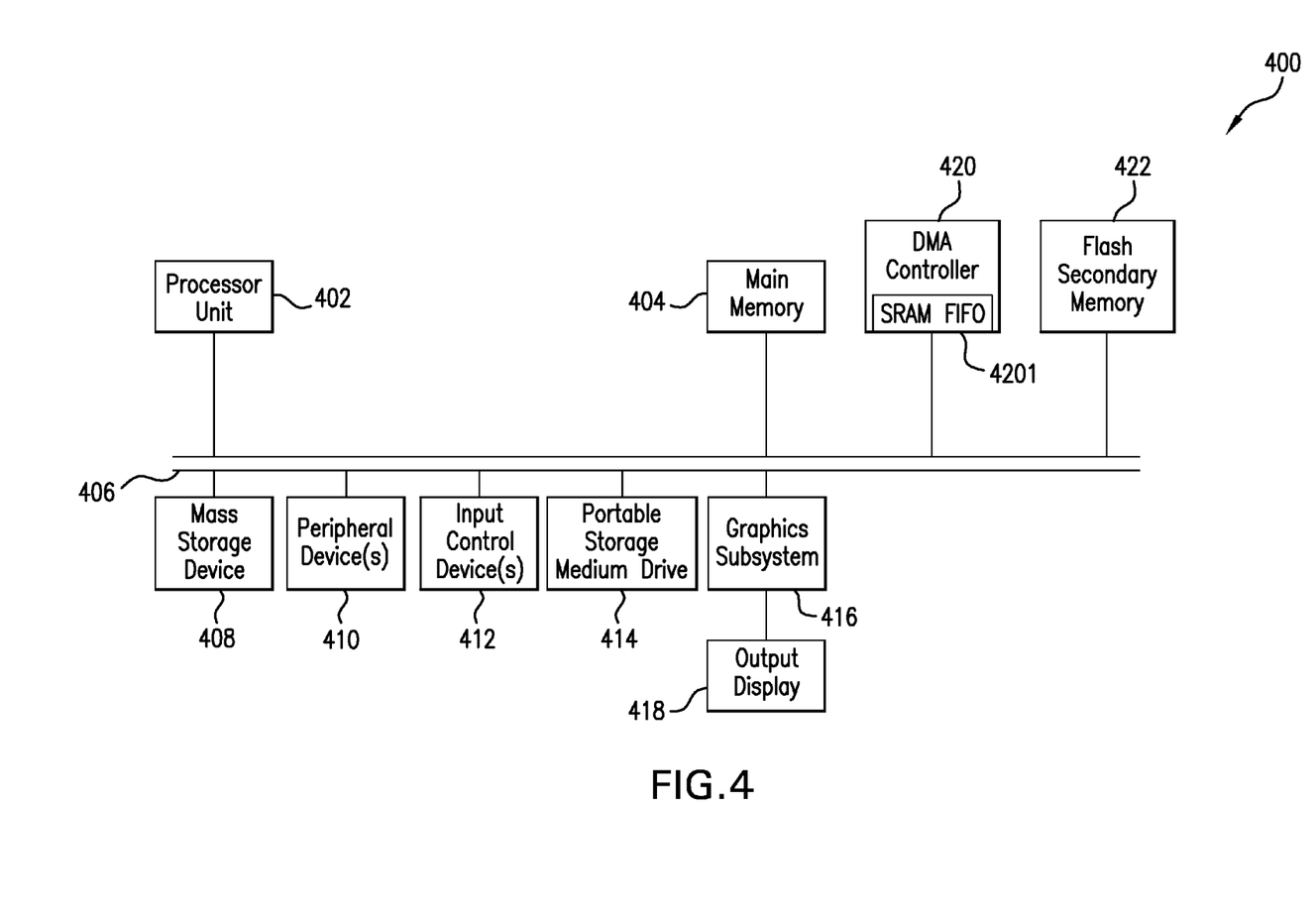
FIG. 4 is a block diagram illustrating an exemplary interconnection of components in a processor-based system for implementing an exemplary embodiment of the present invention.

FIG. 4 illustrates a block diagram of a computer system for executing offloaded data transfers and automatically recovering from un-correctable errors therein in accordance with various embodiments of the present invention. A computer system 400 contains a processor unit 402, a main or primary memory 404, an interconnect bus 406, a mass storage device 408, peripheral device(s) 410, input control device(s) 412, portable storage drive(s) 414, a graphics subsystem 416, and an output display 418. Processor unit 402 may include a single microprocessor or a plurality of microprocessors for configuring computer system 400 as a multi-processor system. Main memory 404 stores, in part, instructions and data to be executed by processor 402. Main memory 404 preferably includes banks of dynamic random access memory (DRAM) as well as high-speed cache memory at various levels of the system architecture. A buffer in the form of an SRAM FIFO 4201 may be located integral to DMA controller 420. Additionally, a secondary memory, such as flash 422, may also be coupled to the bus 406.

For the purpose of simplicity, the components of computer system 400 are connected via interconnect bus 406. However, computer system 400 may be connected through one or more data transport means. For example, processor unit 402 and main memory 404 may be connected via a local microprocessor bus and mass storage device 408, peripheral device(s) 410, portable storage medium drive(s) 414, and graphic subsystem 416 may be connected via one or more input/output (I/O) busses. Mass storage device 408, which may be implemented with a magnetic disk drive, an optical disk drive, a solid state device, an attachment to network storage, and the like, is preferably a non-volatile storage device for storing data, databases, and instructions, to be used by processor unit 402. In a software embodiment, mass storage device 408 may store the software to load it into main memory 404 or into a firmware of DMA controller 420 or a motherboard housing the DMA controller 420.

Portable storage medium drive 414 operates in conjunction with a portable non-volatile storage medium such as a floppy disk, a compact disk read only memory (CD-ROM), or a digital versatile disk read only memory (DVD-ROM), to input and output data and code to and from the computer system 400. In one embodiment, the software is stored on such a portable medium, and is input to computer system 400 via portable storage medium drive 414. Peripheral device(s) 410 may include any type of computer support device such as an input/output (I/O) interface, to add additional functionality to computer system 400. For example, peripheral device(s) 410 may include a network interface card to interface computer system 400 to a network.

Input control device(s) 412 provide a portion of the user interface for a computer system 400 user. Input control device(s) 412 may include an alphanumeric keypad for inputting alphanumeric and other key information; and a cursor control device such as a mouse, a track pad or stylus; or cursor direction keys.

In order to display textual and graphical information, computer system 400 contains graphic subsystem 414 and output display(s) 418. Output display 418 may include a cathode ray tube (CRT) display, liquid crystal display (LCD), plasma display, projector, or the like. Graphic subsystem 416 receives textual and graphical information and processes the information for output to display 418.

In a software implementation, the data-offloading and automatic recovery from un-correctable error software includes a plurality of computer executable instructions, to be implemented on a computer system. Prior to loading in the computer system or firmware, the software may reside as encoded information on a computer-readable tangible medium such as a magnetic floppy disk, a magnetic tape, CD-ROM, DVD-ROM, flash memory, or any other suitable computer readable medium.

In a hardware implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

Figure 6:
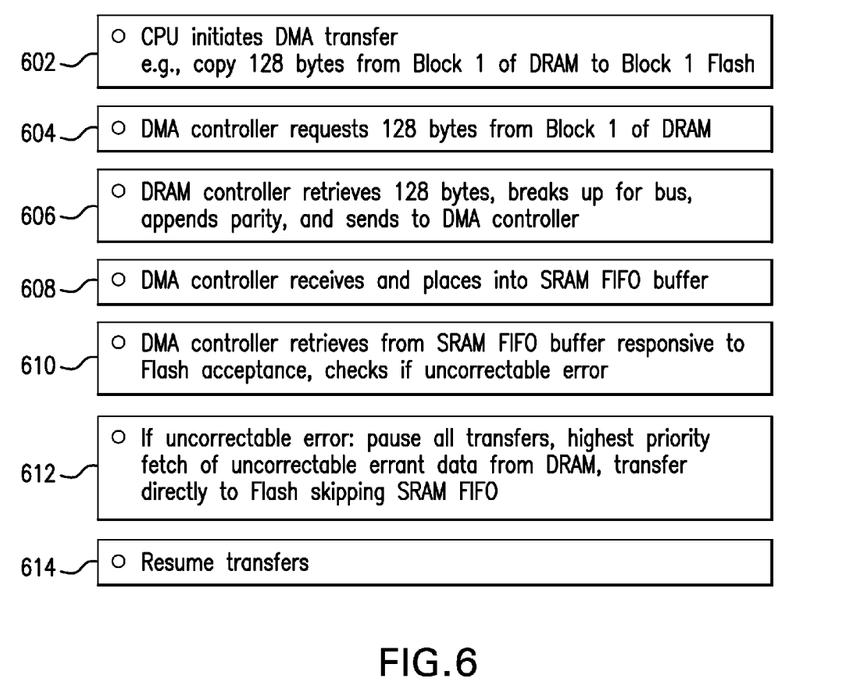
FIG. 6 is another exemplary flow diagram illustrating a transfer flow of data in accordance with an exemplary embodiment of the present invention.

As seen in FIG. 6, at block 602, a central processing unit (CPU) initiates a direct memory access (DMA) transfer. For example, the CPU may instruct the DMA controller (or other such cpu-offloading transfer controller) to transfer "X" amount of bytes starting from a particular address "Y" in a primary DRAM memory to a particular block and page address in a secondary flash memory. For example, the CPU may instruct the DMA controller to copy 128 bits from block 1 of DRAM to block 1 page 1 of flash memory. As another example, the CPU may request that 2048 bits be transferred starting from hex address 0x0 in DRAM memory to address 0x0 in flash.

At block 604, the DMA controller (responding to the CPU request) itself requests 128 bits from block 1 of the DRAM controller. The DMA controller in this regard may be responding to the initial exemplary request of 128 bits, or the DMA controller may be breaking down the second exemplary request for 2048 bits into manageable portions responsive to a determination of the bus width or typical burst length of transfers across the bus. In the example where the requested amount was 2048 bits of data with a bus width of 128 bits, the DMA controller may request 16 read burst requests to the DRAM controller. Furthering the example where 2048 bits were requested, the DMA controller, having split up the 2048 bit read requests into 16 separate burst read requests of 128 bits apiece would issue an exemplary sequence of commands requesting the first 128 bits from address 0x0, a second burst read of 128 bits from address 0x80, a third 128 bits from address 0x100, and the like, until the entirety of the 2048 bits were read.

After each read request or burst read request, at block 606, the DRAM controller responsively retrieves 128 bits (or an amount the bus is able to handle in each burst), calculates a parity bit, preferably appended to the most significant bit of each byte of the data and sends this to the DMA controller. The parity may be generated according to any measures known to one of skill in the art to create a checksum, digest, hash, or cyclic redundancy code (CRC). A parity bit may be used for each byte (8 bits) of data or may be employed for more or less data according to the reliability of the transmission path and components thereon. Such parity bits enable the DMA controller to determine whether the data retrieved from the DRAM was corrupted in-flight through the DRAM controller to the DMA controller. In an exemplary embodiment, the data received from the DRAM would be evaluated and the DRAM controller would generate parity to protect at least one bit error per byte, thereby if the bus with the data transferring the system is 128 bits (16 bytes), there would be 16 bits of parity received for each burst or beat (128 bits) of data being received from the DRAM controller.

At block 608, the DMA controller receives a given burst or beat of data (in this example, 128 bits of data plus 16 bits of parity for a total of 144 bits) which would be placed into an intermediate SRAM buffer. The SRAM buffer may be located within the DMA controller or may be external thereto. As the SRAM buffer is more error prone, faulty, or unreliable, this data being stored therein is preferably Error Correcting Codec (ECC) protected with, for example, one bit of correction and two bits of detection per byte. Firstly, the data plus parity retrieved from the DRAM controller is checked to determine whether any errors occurred in-flight from the DRAM controller to the DMA controller. Provided that no errors have been detected, an ECC may be generated based upon the data. In such manner, if data is lost or corrupted within the SRAM buffer while waiting to be written to flash, the ECC should provide suitable redundancy to be able to regenerate at least one lost bit. The ECC generator logic may be included within the DMA controller logic or may be external thereto. Additionally, the ECC generator may have a parity checker/generator built-in whereby the data retrieved from the DRAM controller may be verified to determine whether bit errors in the data have occurred. ECC generator logic may include, append, or concatenate an additional field to the data or an additional bit which may be utilized as a "bad" flag to indicate whether data originally received from the DRAM controller was erroneous. The ECC generator may utilize the entirety of the data plus parity bits plus "bad" flag bit to generate an ECC code. Alternatively, the ECC generator may strip off the parity and may omit the "bad" code and merely utilize an ECC generator on just the data received. At least the data and the bad flag along with the ECC check bits are then written into the SRAM buffer.

At block 610, the DMA controller retrieves the data packet, burst, or beat of data from the SRAM FIFO buffer responsive to a determination of the flash state. In an exemplary embodiment, the flash controller or secondary memory may signal to the DMA control logic or DMA controller that it has completed writing a previous burst, beat, or data packet and is therefore ready for another. At this point, the DMA controller may retrieve another packet from the SRAM buffer and perform a corresponding ECC checker function to determine whether the packet was corrupted within the SRAM FIFO.

The ECC checker may have three potential outcomes: 1) if the data was bad, and the ECC check bits are able to correct the error and the "bad" bit is zero, then good parity is generated for the data and is sent forward to be sent to the flash device or secondary memory; 2) if the data and "bad" and ECC check bits do not have an uncorrectable error but the bad bit is "1", bad parity is intentionally generated for the data and is then sent forward to the flash device; lastly, 3) if the data and "bad" and ECC check bits have an uncorrectable error, bad parity is generated for the data and is sent forward to be sent to the flash device. Stated another way—if there was an error on transmission from DRAM to ECC generator prior to ECC generation; OR if there was an error that exceeds the correction threshold of the selected ECC data—then an un-correctable error has occurred and a bad parity leaving the buffer will intentionally be generated to cause the DMA error detection logic to instigate a high priority re-retrieval from the primary memory directly to the secondary memory exclusive of the faulty buffer.

At block 612, if the ECC checker determines that there is an uncorrectable error, the data sent along to the flash drive will be picked up at the intermediate DMA error detection logic. The DMA error detection logic checks for data and parity errors before sending the same to the flash device. If there is no error, the data is sent to the flash or secondary memory. If, however, there is a parity error, the data is dropped and all transfers from SRAM are stalled. Information is sent to the DMA control logic indicating that a parity error has been detected on a particular "beat" (e.g. 16 byte/128 bit chunk) within the total data being transferred. It is seen that the ECC checker has instigated the DMA error detection logic into finding a parity error by intentionally mis-encoding or encoding an incorrect parity value (relative to the actual data portion) to be sent along with the data portion. The DMA controller gives the error information received from the DMA error detection logic priority and issues a fetch of the "beat" from the address calculated with offset information provided from the DMA error detection logic and the starting address that it was originally passed for the totality of the transfer. Knowing the starting point of the transfer as instructed by the CPU to the DMA controller initially, the burst, beat, chunk or pulse width of each packet transferred across the bus, and a counter or other such enumeration measure within the DMA error checking logic or the DMA controller in general, the DMA control logic may thereby determine which beat or packet was erroneous and uncorrectable. In this manner, the DMA controller may selectively instruct the DRAM or first memory controller to refetch or retrieve just the erroneous or uncorrectable portion from the DRAM/primary memory rather than interrupting the CPU to handle a system crash, system restart, cleaning, and subsequent re-transmittal of the entirety of the requested transaction.

The uncorrectably errant data burst re-retrieved from the primary memory (DRAM), will be initially evaluated and have a parity generated preferably within the DRAM or first memory controller. This data plus parity then is sent directly to the DMA error detection logic, thereby bypassing the entirety of the ECC generation, SRAM buffer, and ECC checker. The DMA error detection logic then separates the data portion from the parity portion, and preferably runs a symmetric algorithm as used in the DRAM or first memory controller to arrive at a parity value. The parity value may be compared against the parity value generated by the DRAM or first memory controller and if there is identity between the two, then it may be assumed that the re-fetched or re-retrieved data is verified and may be directly written to the flash memory.

Once the re-retrieved data has been written to the flash device, data transfer from the SRAM buffer to the flash device or secondary memory resumes. However, if the parity data check generated in the DMA error detection logic determines that the data directly re-retrieved from the primary or DRAM memory is erroneous or has been corrupted, then the process may be repeated again once or a plurality of times. In an exemplary embodiment, this repeat retrieval error detection is performed eight times and on an eighth sequential failure, an interrupt may be sent to the CPU to advise that serious problems may exist with either the primary memory or the path between primary and the DMA error detection logic. To avoid stalling the system, the DMA controller may then throw away all of the data related to that transfer and go into an IDLE state and await further action from the CPU or other such instructions.

At block 614, having re-retrieved successfully the uncorrectably errant data, the DMA controller signals to resume all transfers. If the transfer of the entirety of the requested data is performed successfully, the DMA controller interrupts the CPU to advise that the transfer was completed.

Figure 7:
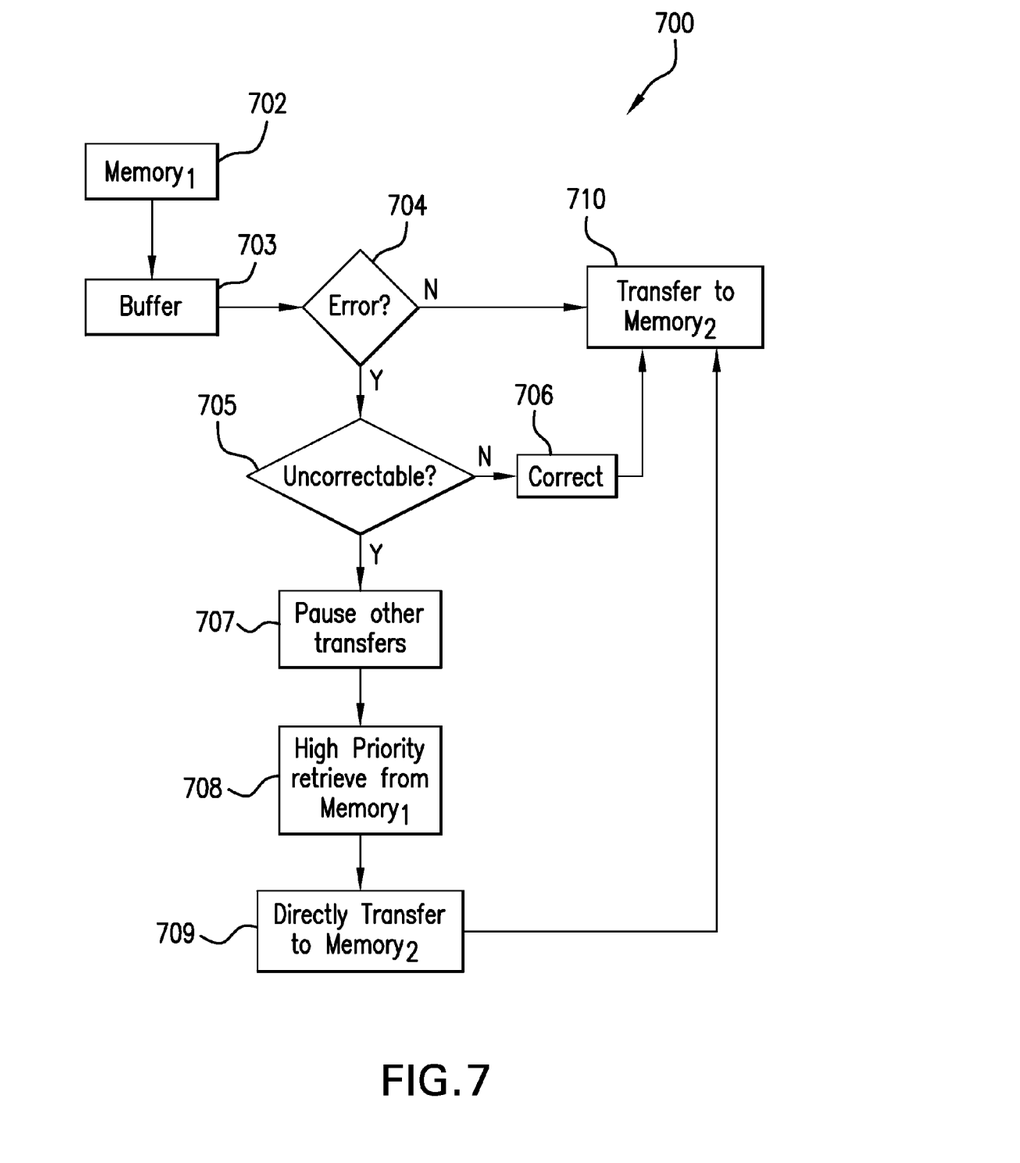
FIG. 7 is an exemplary flow chart illustrating an error detection flow in accordance with certain embodiments of the present invention; and, FIG. 8 is a simplified flow diagram illustrating a recovery flow from a detected uncorrectable error in accordance with certain aspects of the present invention.

As seen in FIG. 7, an exemplary error determination/correction flow is illustrated: a first memory 702 provides a data packet to a buffer 703. As data packets are being pulled out of buffer 703, an error detection process 704 is performed. A decision is made whether an error exists in the data retrieved from buffer 703 or not. If no error is detected at block 704, then the data is passed from the buffer 703 and transferred to the secondary memory 710.

If, however, an error is detected at decision block 704, then a secondary determination is made whether the error is an uncorrectable error. As Error Correcting Codec (ECC) data has been generated, it is possible to correct errors that may have occurred in the buffer 703 or in-flight therefrom. The ECC is generally able to recover one piece of erroneous data per word/byte, but generally may not restore more than one corrupted bit. Therefore, if at decision block 705, it is determined that the error is not uncorrectable, then the flow proceeds to block 706 where the ECC data is used in conjunction with the payload data of the data packet retrieved from the buffer 703 to correct the determined error therein. As the data packet has been corrected and is now in the same state it was that it was inserted into the buffer 703, then the data packet may be transferred to the secondary memory at block 710. If, however, the determination at block 705 was in the affirmative that the error determined at block 704 is indeed uncorrectable, then the flow proceeds to block 707 where all other transfers from the SRAM buffer 703 are paused. At block 708, a high priority retrieval from the primary memory 1 702 is enacted whereby the uncorrectably erroneous data is re-retrieved from the primary memory 1 702. At block 709, this re-retrieved data is directly transferred to memory 2 at block 710. In an alternative embodiment, transfers may be maintained from SRAM buffer while the re-retrieval process is enacted.

Figure 8:
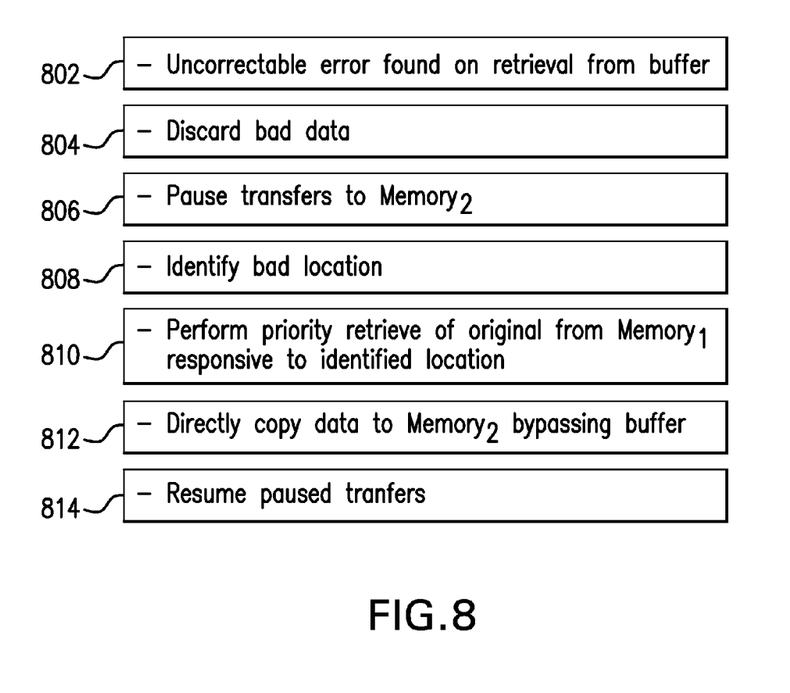

As seen in FIG. 8, an exemplary flow for the determination of an uncorrectable error is seen. At block 802, an uncorrectable error has been found on the retrieval from the SRAM buffer meaning that potentially two or more bits have been corrupted and thereby the ECC error correction data is ineffectual as this would lead to a multi-variable problem. At block 804, the uncorrectable data is discarded. At block 806, all transfers to the secondary memory or flash and all transfers from the SRAM buffer are paused or stalled. At block 808, the location in the primary memory of the uncorrectably corrupted data packet is determined by, for example, evaluating the starting location, the packet size, and the number of successfully-completed written packets to the secondary memory. Once the location of the errant data has been identified, flow proceeds to block 810.

At block 810, a high priority retrieval of the identified location from the original primary memory is performed. Such high priority retrieval may be enacted by increasing the priority of the retrieval, by relatively decreasing all or a portion of other retrievals, or by cancelling/pausing/stalling all or a portion of other retrievals, and the like. At block 812, the re-retrieved data is directly copied from the primary memory to the secondary memory bypassing the buffer. At block 814, the paused transfers from block 806 are resumed or returned to a higher priority according to the method of prioritization used. While particular attention has been paid to the unreliability of SRAM, intermediate storage buffers in general, and transmission lines/traces, as exemplary cases, all manner of errors at all stages of a system are contemplated and addressed herein.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of circuit design and implementation flows and processing steps may be reversed or interposed, all without departing from the spirit or scope of the invention as defined in the appended Claims.

What is claimed is:

1. A method for transmission of data from a first memory to a second memory via intermediate storage having dynamic error recovery, the method comprising:
   establishing a transfer controller coupled to the first and second memories and a storage intermediary, data to be transferred being stored in the first memory;
   executing said transfer controller to actuate transfer of the data from said first memory in a plurality of segments of selectively set length to said storage intermediary;
   monitoring said storage intermediary for uncorrectable error in each transferred data segment;
   writing the data segment to said second memory in the absence of an uncorrectable error therein; and,
   upon detection of an uncorrectable error in a transferred data segment, alternatively executing said transfer controller to re-transfer the data segment from said first memory and writing to said second memory with bypass of said storage intermediary.

2. The method as recited in claim 1, wherein said first memory includes Dynamic Random Access Memory (DRAM), said second memory includes flash memory, and said storage intermediary includes a Static Random Access Memory (SRAM) buffer.

3. The method as recited in claim 2, wherein said storage intermediary includes an SRAM First In First Out (FIFO) buffer.

4. The method as recited in claim 3, wherein said buffer includes a rate matching SRAM FIFO buffer.

5. The method as recited in claim 1, wherein said step of monitoring for uncorrectable errors includes performing a parity check on a data segment retrieved from said storage intermediary before being written to said second memory.

6. The method as recited in claim 5, further comprising corrupting a parity portion of a corresponding uncorrectably errant data segment, the corrupted parity portion being generated to be inconsistent with the data segment.

7. The method as recited in claim 6, wherein the step of re-transferring the data segment from said first memory includes determining a location in the primary memory and selectively retrieving a replacement segment therefrom with elevated priority relative to other retrievals responsive to an incorrect parity portion.

8. The method as recited in claim 7, wherein said re-transferring the data segment from said first memory to said second memory with bypass of said storage intermediary includes actuating a bypass controller to route the replacement segment exclusive of said storage intermediary.

9. The method as recited in claim 1, wherein the step of executing said transfer controller to transfer data segments in said first memory to said second memory via a storage intermediary includes executing said transfer controller to:
   generate a first parity portion based on an evaluation of a data segment prior to completion of transfer of the data segment into said second memory from said first memory;
   determine if the data segment has been corrupted by evaluating the parity portion and responsively setting a bad flag appended to the data segment;
   generating an Error Correcting Codec (ECC) portion based on at least part of the data segment to thereby enable regenerative restoration of at least one anticipated error in the data segment;
   retrieving the data segment from said storage intermediary; and,
   responsive to an affirmative determination based upon at least the ECC portion that an uncorrectable error has occurred, selectively generating an incorrect parity portion, the incorrect parity portion being generated to be inconsistent with the data segment to thereby indicate corruption in the system.

10. The method as recited in claim 1, wherein said transfer controller includes a Central Processing Unit (CPU).

11. The method as recited in claim 1, wherein said transfer controller includes a Direct Memory Access (DMA) controller coupled to access said first and second memories and said storage intermediary.

12. The method as recited in claim 1, wherein the length of segments of a frame of data are selectively set responsive to a determination of bus channel width between said first memory and said second memory.

13. A system for ensuring reliable data transfer by automatically recovering from un-correctable errors during transfers from a first memory to a second memory via a storage intermediary, the system comprising:
   a transfer controller coupled to the first and second memories and the storage intermediary to control transfer of data therebetween;
   a storage intermediary disposed intermediate said first and second memories, said storage intermediary temporarily storing data segments destined for said second memory;
   an error detection module signaling said transfer controller to retrieve a replacement data portion of a corrupt data segment from said first memory responsive to an affirmative determination of corruption in the corrupt data segment received by said error detection module;
   a bypass controller coupled intermediate said first memory and said second memory, said bypass controller selectively transmitting the replacement data portion to said second memory, said transmitting bypassing said storage intermediary responsive to said corruption determination.

14. The system as recited in claim 13, wherein said transfer controller includes a Central Processing Unit (CPU).

15. The system as recited in claim 13, wherein said transfer controller includes a Direct Memory Access (DMA) Controller.

16. The system as recited in claim 15, wherein said first memory includes a Dynamic Random Access Memory (DRAM); and, said second memory includes a flash memory.

17. The system as recited in claim 16, wherein said storage intermediary includes a Static Random Access Memory (SRAM) buffer.

18. The system as recited in claim 17 further including an Error Correcting Codec (ECC) controller coupled to said SRAM buffer to generate an ECC portion for data segments entering said SRAM buffer and regenerate an errant data segment based upon the ECC portion responsive to a determination of corruption in the errant data segment.

19. The system as recited in claim 18 wherein the ECC controller generates incorrect parity data for the errant data segment responsive to a failure of regeneratively restoring corruptions in the errant data segment based on the ECC portion, the incorrect parity data is generated to be inconsistent with the errant data segment.

20. A method for ensuring reliable transmission of data from a first memory to a second memory via a buffer, the method comprising:
   executing a transfer controller to transfer a segment of a requested frame of data from a first memory to a second memory via a buffer;
   executing an error controller to detect an uncorrectable erroneous segment upon retrieval of the segment from said buffer before completion of transfer of the requested frame of data into said second memory;
   identifying a location in said first memory corresponding to the uncorrectable erroneous segment;
   selectively retrieving a replacement segment from the identified location in said first memory; and,
   transmitting the replacement segment to said second memory without intermediate passage through said buffer.

21. The method as recited in claim 20, wherein the step of transmitting the replacement segment to said second memory without intermediate passage through said buffer includes the step of actuating a bypass controller to selectively route the replacement segment bypassing said buffer.

22. The method as recited in claim 20, wherein said buffer is an Error Correcting Codec (ECC)-protected buffer.

23. A system for transmission of data from a first memory to a second memory via intermediate storage having dynamic error recovery, the system comprising:
   a first memory and a second memory, data to be transferred being stored in said first memory;
   a storage intermediary coupled to said second memory;
   a transfer controller coupled to said first memory, said second memory, and said storage intermediary, said transfer controller actuating transfer of the data from said first memory in a plurality of segments of selectively set length to said storage intermediary;
   an error detecting module monitoring said storage intermediary for uncorrectable error in each transferred data segment, said transfer controller writing the data segment to said second memory in the absence of an uncorrectable error therein; and, upon detection of an uncorrectable error in a transferred data segment, alternatively executing said transfer controller to re-transfer the data segment from said first memory and writing the re-transferred data segment to said second memory with bypass of said storage intermediary.

24. The system as recited in claim 23 further comprising a bypass controller coupling said first memory and said second memory, said bypass controller selectively routing the re-transferred data segment to said second memory without intermediate passage through said storage intermediary.

25. The system as recited in claim 24 further comprising an Error Correcting Codec (ECC) controller coupled to said storage intermediary, said ECC controller evaluating a parity portion of an incoming data segment, appending at least an indicia of corruption responsive to the evaluation of the parity portion, transferring the data segment to said storage intermediary, and upon retrieval of the data segment therefrom, selectively corrupting the parity portion thereof to be inconsistent with the data segment responsive to an evaluation of the indicia.

* * * * *